US012246633B2

(12) United States Patent
Kim et al.

(10) Patent No.: US 12,246,633 B2
(45) Date of Patent: Mar. 11, 2025

(54) DEVICE AND METHOD FOR CONTROLLING SEAT OF VEHICLE

(71) Applicants: Hyundai Motor Company, Seoul (KR); Kia Corporation, Seoul (KR)

(72) Inventors: Ki Chang Kim, Gyeonggi-Do (KR); Dong Chul Park, Gyeonggi-do (KR); Tae Kun Yun, Gyeonggi-do (KR); Sang Jin Hong, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 372 days.

(21) Appl. No.: 17/811,829

(22) Filed: Jul. 11, 2022

(65) Prior Publication Data

US 2023/0147411 A1 May 11, 2023

(30) Foreign Application Priority Data

Nov. 5, 2021 (KR) .................. 10-2021-0151747

(51) Int. Cl.
*B60N 2/90* (2018.01)
*B60N 2/00* (2006.01)
*B60N 2/02* (2006.01)

(52) U.S. Cl.
CPC ........... *B60N 2/976* (2018.02); *B60N 2/0028* (2023.08); *B60N 2/003* (2023.08); *B60N 2/0035* (2023.08); *B60N 2/0273* (2023.08); *B60N 2002/981* (2018.02); *B60N 2210/40* (2023.08); *B60N 2210/50* (2023.08); *B60N 2230/30* (2023.08)

(58) Field of Classification Search
None
See application file for complete search history.

(56) References Cited

U.S. PATENT DOCUMENTS

| | | | |
|---|---|---|---|
| 11,045,379 B2 | 6/2021 | Yamauchi et al. | |
| 11,058,958 B2 | 7/2021 | Lee et al. | |
| 2007/0246979 A1* | 10/2007 | Browne | B60N 2/806 297/216.12 |
| 2019/0299830 A1* | 10/2019 | Alequin | A61H 23/00 |
| 2019/0358111 A1 | 11/2019 | Yamauchi et al. | |
| 2020/0139870 A1* | 5/2020 | Mergl | G06F 3/165 |

(Continued)

FOREIGN PATENT DOCUMENTS

| | | |
|---|---|---|
| JP | 2019-202625 A | 11/2019 |
| KR | 10-1731190 B1 | 4/2017 |

(Continued)

*Primary Examiner* — Peter D Nolan
*Assistant Examiner* — Jacob Kent Besteman-Street
(74) *Attorney, Agent, or Firm* — Fox Rothschild LLP

(57) ABSTRACT

A device and a method for controlling a seat of a vehicle includes a detector for detecting vehicle environment information, a vibration generator mounted on the vehicle seat to generate the seat vibration, and a controller electrically connected to the detector and the vibration generator, and the controller detects seat environment information through the detector, determines a weight and a sitting posture of a user seated in the vehicle seat based on the seat environment information, determines a vibration pattern and a vibration excitation force based on the weight and the sitting posture of the user, and generates the seat vibration by controlling the vibration generator based on the determined vibration pattern and vibration excitation force.

14 Claims, 7 Drawing Sheets

(56) References Cited

U.S. PATENT DOCUMENTS

| | | |
|---|---|---|
| 2021/0016187 A1 | 1/2021 | Lee et al. |
| 2021/0101512 A1 | 4/2021 | Shimizu et al. |
| 2021/0354612 A1* | 11/2021 | Migneco ................. B60N 2/99 |
| 2022/0194410 A1 | 6/2022 | Kim et al. |
| 2022/0203891 A1 | 6/2022 | Hong |

FOREIGN PATENT DOCUMENTS

| | | |
|---|---|---|
| KR | 10-1926990 B1 | 12/2018 |
| KR | 10-2021-0008653 A | 1/2021 |
| KR | 10-2021-0047674 A | 4/2021 |
| KR | 10-2022-0089738 A | 6/2022 |
| KR | 10-2022-0094398 A | 7/2022 |

\* cited by examiner

●:140

| DIVISION | MAXIMUM BODY PRESSURE<br>(SMALL IS BETTER) |
|---|---|
| SITTING POSTURE (1) | 1.7 N/cm² |
| SITTING POSTURE (2) | 2.3 N/cm² |

| DIVISION | DISTRIBUTION AREA | BACK SENSITIVITY | THIGH SENSITIVITY |
|---|---|---|---|
| SITTING POSTURE (1) | 2928 cm² | 5~24 | 4~19 |
| SITTING POSTURE (2) | 2365 cm² | 6~32 | 9~39 |

# DEVICE AND METHOD FOR CONTROLLING SEAT OF VEHICLE

CROSS-REFERENCE TO RELATED APPLICATION

This application claims under 35 U.S.C. § 119(a) the benefit of Korean Patent Application No. 10-2021-0151747, filed in the Korean Intellectual Property Office on Nov. 5, 2021, the entire contents of which are incorporated herein by reference.

BACKGROUND

Technical Field

The present disclosure relates to a device and a method for controlling a seat of a vehicle.

Description of the Related Art

Devices of various functions may be applied to a vehicle in consideration of user convenience, safety, interest, and the like. One of such devices may be a vibration seat. The vibration seat may generate vibration by controlling a vibration terminal built into a vehicle seat.

SUMMARY

An exemplary embodiment of the present disclosure may provide a device and a method for controlling a seat of a vehicle including to generate a vibration of the in association with a sound of a sound source being reproduced or to generate a vibration corresponding to a corresponding dangerous situation when the any of a variety of dangerous situations occur.

An embodiment of the present disclosure may provide a device and a method for controlling a seat of a vehicle that, when seat vibration occurs, optimize a frequency, a pattern, and/or an excitation force of the seat vibration based on a weight and a sitting posture (a sitting state) of a vehicle occupant. In an exemplary embodiment, the device and method for controlling a seat of the vehicle may be on the basis of a sound.

According to an exemplary embodiment of the present disclosure, a device for controlling a vehicle seat for controlling seat vibration includes a detector for detecting vehicle environment information, a vibration generator mounted on the vehicle seat to generate the seat vibration, and a controller electrically connected to the detector and the vibration generator, and the controller detects seat environment information through the detector, determines a weight and a sitting posture of a user seated in the vehicle seat based on the seat environment information, determines a vibration pattern and a vibration excitation force based on the weight and the sitting posture of the user, and generates the seat vibration by controlling the vibration generator based on the determined vibration pattern and vibration excitation force. According to an embodiment of the present disclosure, the device for controlling a vehicle seat for controlling seat vibration may be based on a sound generated from a sound generator, and may include a sound generator for generating a sound, and the generation of the seat vibration is based on the sound.

In an exemplary embodiment, the detector may detect a frequency-acceleration and a surface pressure for a plurality of seat portions using an accelerometer and a surface pressure sensor.

In an exemplary embodiment, the controller may be configured to analyze the frequency-acceleration and a surface pressure distribution for each seat portion of the plurality of seat portions to estimate a maximum body pressure on the vehicle seat and the sitting posture.

In an exemplary embodiment, the controller may be configured to determine an appropriate vibration frequency based on the weight of the user, and distribute the appropriate vibration frequency as an appropriate vibration frequency for each seat portion of the plurality of seat portions based on the sitting posture.

In an exemplary embodiment, the controller may be configured to determine a level and a peak time of the seat vibration based on the weight and the sitting posture of the user.

In an exemplary embodiment, the controller may be configured to determine whether to use a low-pass filter based on the sound, filter a low-frequency band of the sound when it may be determined to use the low-pass filter to generated a filtered sound, and determine the pattern and the vibration excitation force of the seat vibration based on the filtered sound.

In an exemplary embodiment, the controller may be configured to filter a sound of a predetermined frequency band from the sound when it may be determined to not use the low-pass filter to generate a filtered sound, process the filtered sound as a vibration signal having a vibration frequency based on a magnitude of a waveform of the filtered sound, and determine the pattern and the vibration excitation force of the seat vibration based on the processed vibration signal.

In an exemplary embodiment, the controller may be configured to correct the vibration excitation force based on at least one of the sitting posture, the sound, a travel environment, or a surrounding situation.

According to an exemplary embodiment of the present disclosure, a method for controlling a vehicle seat for controlling seat vibration includes detecting, by a controller, seat environment information through a detector, determining, by the controller, a weight and a sitting posture of a user seated in the vehicle seat based on the seat environment information, determining, by the controller, a vibration pattern and a vibration excitation force based on the weight and the sitting posture of the user, and generating, by the controller, the seat vibration by controlling the vibration generator based on the determined vibration pattern and vibration excitation force. The method for controlling a vehicle seat for controlling seat vibration may be based on a sound generated from a sound generator, and may therefore include generating a sound from a sound generator, and the generation of the seat vibration is based on the sound.

In an exemplary embodiment, the detecting of the seat environment information may include detecting, by the detector, a frequency-acceleration and a surface pressure for a plurality of seat portions using an accelerometer and a surface pressure sensor.

In an exemplary embodiment, the determining of the weight and the sitting posture of the user may include analyzing, by the controller, the frequency-acceleration and a surface pressure distribution for each seat portion of the plurality of seat portions to estimate a maximum body pressure on the vehicle seat and the sitting posture.

In an exemplary embodiment, the method may further include determining, by the controller, an appropriate vibration frequency based on the weight of the user, and distributing, by the controller, the appropriate vibration frequency as an appropriate vibration frequency for each seat portion of the plurality of seat portions based on the sitting posture.

In an exemplary embodiment, the determining of the vibration pattern and the vibration excitation force may include determining, by the controller, a level and a peak time of the seat vibration based on the weight and the sitting posture of the user.

In an exemplary embodiment, the determining of the vibration pattern and the vibration excitation force may further include determining, by the controller, whether to use a low-pass filter based on the sound, filtering, by the controller, a low-frequency band of the sound when it may be determined to use the low-pass filter to generate a filtered sound, and determining, by the controller, the pattern and the vibration excitation force of the seat vibration based on the filtered sound.

In an exemplary embodiment, the determining of the vibration pattern and the vibration excitation force may include filtering, by the controller, a sound of a predetermined frequency band from the sound when it may be determined to not use the low-pass filter to generate a filtered sound, processing, by the controller, the filtered sound as a vibration signal having a vibration frequency based on a magnitude of a waveform of the filtered sound, and determining, by the controller, the pattern and the vibration excitation force of the seat vibration based on the processed vibration signal.

In an exemplary embodiment, the method may further include correcting the vibration excitation force based on at least one of the sitting posture, the sound, a travel environment, or a surrounding situation.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
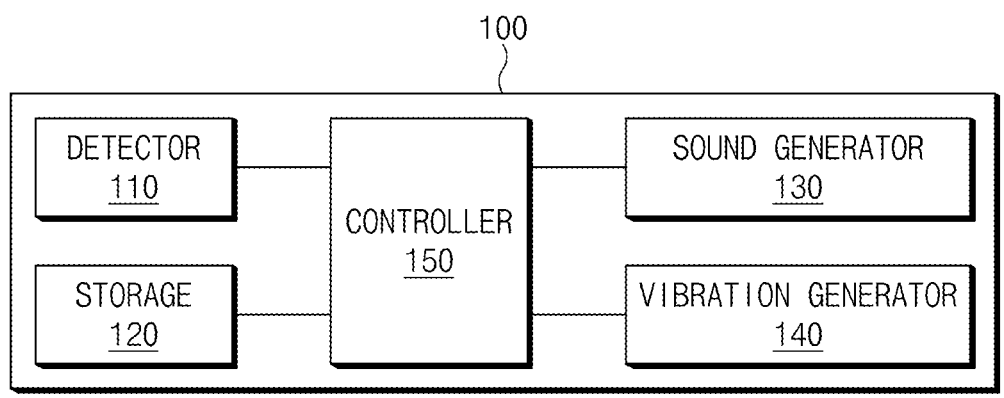
FIG. 1 is a block diagram showing a vehicle seat control device according to embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure may present a technology that may provide sound-based vibration optimized for each user as seat vibration may be controlled in consideration of a weight, a sitting posture, and the like of a user (a driver, a sitting person, an occupant, and the like) seated in a seat in a situation in which the seat vibration may be generated by controlling a vibration terminal mounted in the seat based on a sound (a music, a virtual sound, a healing sound, and the like) reproduced in a vehicle.

Figure 2:
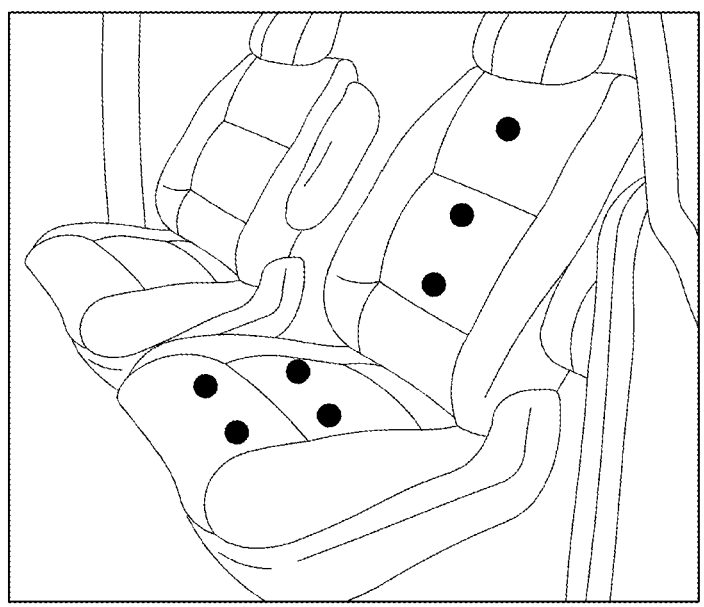
FIG. 2 is a view showing an installation example of a vibration generator according to embodiments of the present disclosure.
Figure 3:
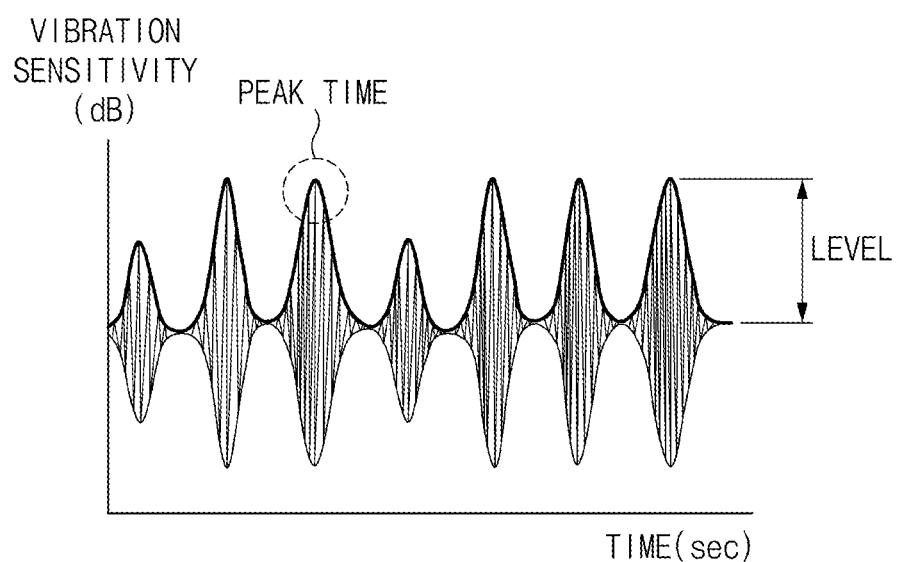
FIG. 3 is an exemplary diagram illustrating a vibration pattern according to embodiments of the present disclosure.
Figure 4A:
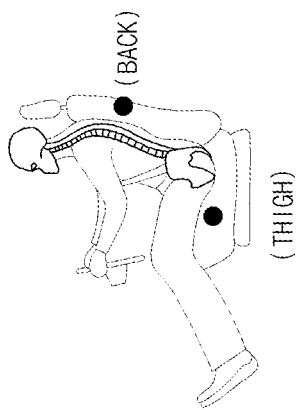
FIGS. 4A-4B is an exemplary diagram illustrating a sitting posture according to embodiments of the present disclosure.
Figure 4B:
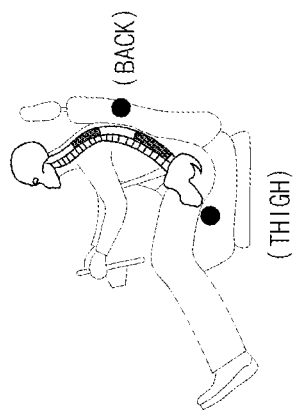

FIG. 1 is a block diagram showing a vehicle seat control device according to embodiments of the present disclosure, FIG. 2 is a view showing an installation example of a vibration generator according to embodiments of the present disclosure, FIG. 3 is an exemplary diagram illustrating a vibration pattern according to embodiments of the present disclosure, and FIGS. 4A-4B are exemplary diagrams illustrating different sitting postures according to embodiments of the present disclosure.

Referring to FIG. 1, a vehicle seat control device 100 may include a detector 110, storage 120, a sound generator 130, a vibration generator 140, a controller 150, and the like.

The detector 110 may detect (sense) external and internal environment information (vehicle environment information) of the vehicle. The detector 110 may acquire the vehicle environment information through sensor(s) mounted on the vehicle and/or other electronic control units (ECUs). The vehicle environment information may include information such as a seat environment, a travel environment, the sound of the reproduced music (a sound source), and/or an image of a surrounding region.

The detector 110 may use an accelerometer and/or a surface pressure sensor mounted on a vehicle seat to acquire a frequency-acceleration and/or a surface pressure for each seat portion of a plurality of seat portions (e.g., a seat back, a seat cushion, and/or a leg-rest). The detector 110 may transmit seat environment information containing the measured frequency-acceleration and/or surface pressure for each seat portion of the plurality of seat portions to the controller 150.

The detector 110 may detect the travel environment information through one or more sensors (e.g., a speed sensor and/or an accelerator pedal position sensor (APS)) and/or other ECU. The travel environment may be divided into idle, constant speed, and/or acceleration. The detector 110 may detect a sound signal (the sound) of the music (the sound source) reproduced by the sound generator 130 using a sound sensor (e.g., a microphone and the like). In addition, the detector 110 may directly detect (receive) the sound signal output from the sound generator 130. The detector 110 may acquire the image of the surrounding region of the vehicle using an image sensor or the like. The image of the surrounding region may be used to determine whether the surrounding region of the vehicle may be in a dangerous situation.

The storage 120 may store the information (data) detected by the detector 110. The storage 120 may store at least one sound source (e.g., classic, pop, sound effect, and the like). The storage 120 may include a flash memory, a hard disk, a solid state disk (SSD), a magnetic disk, an optical disk, a magnetic drum, and/or a magnetic tape. The storage may include any storage media that may store thereon non-transitory machine readable instructions that may perform the functions described herein when executed by a processor. The storage may also or alternatively include any storage media that may store thereon non-transitory machine readable data and/or instructions, that may include data, music, songs, etc., information (data) detected by the detector, or combinations thereof according to embodiments described herein. The memory may include at least one of storage media such as a flash memory, a hard disk, a solid state disk (SSD), a secure digital card (SD card), a random access memory (RAM), a static random access memory (SRAM), a read only memory (ROM), a programmable read only memory (PROM), an electrically erasable and programmable ROM (EEPROM), and/or an erasable and programmable ROM (EPROM).

The sound generator 130 may reproduce the sound source that may be stored in advance or streamed in real time and output the sound source to the outside. The sound generator 130 may include an amplifier and/or a speaker. The amplifier may amplify an electrical signal of the music sound reproduced by the sound generator 130. A plurality of speakers may be installed at different locations inside and/or outside the vehicle, and may convert the electric signal amplified by the amplifier into a sound wave.

The vibration generator 140 may be an actuator that generates vibration (a vibration signal) that may be a tactile signal under control of the controller 150. At least two vibration generators 140 may be mounted at different locations of the vehicle seat. As shown in FIG. 2, each vibration generator 140 may be mounted on each of the seat portions, that is, the seat back, the seat cushion, and/or the leg-rest. At least one vibration generator 140 may be mounted on each seat portion. The vibration generator 140 may include at least one vibration terminal (a vibrator).

The controller 150 may be electrically connected to the detector 110, the storage 120, the sound generator 130, and the vibration generator 140. The controller 150 may control be configured to control the overall operations of the vehicle seat control device 100.

Each of the detector 110, the sound generator 130, the vibration generator 140, and the controller 150 may include at least one processor. The at least one processor may be a processing device such as an application specific integrated circuit (ASIC), a digital signal processor (DSP), a programmable logic device (PLD), a field programmable gate arrays (FPGA), a central processing unit (CPU), a microcontroller, and/or a microprocessor. Each of the detector 110, the sound generator 130, the vibration generator 140, and the controller 150 may include a memory inside and/or outside. The memory may be a non-transitory storage medium that stores instructions executed by the at least one processor. The memory may include at least one of storage media such as a flash memory, a hard disk, a solid state disk (SSD), a secure digital card (SD card), a random access memory (RAM), a static random access memory (SRAM), a read only memory (ROM), a programmable read only memory (PROM), an electrically erasable and programmable ROM (EEPROM), and/or an erasable and programmable ROM (EPROM).

The controller 150 may be configured to generate the vibration in the vehicle seat by controlling the vibration generator 140 based on the sound (e.g., the virtual sound, the healing sound, or the like) of the sound source (the music) reproduced by the sound generator 130. When sensing a sound generation event (e.g., the user pressing a music reproduction button, a warning output resulted from sensing of the dangerous situation, and the like), the sound generator 130 may search for a sound source matching the corresponding event from the storage 120 and reproduce the sound source. The controller 150 may sense the sound output from the sound generator 130 and control the seat vibration based on the sensed sound.

The controller 150 may detect vehicle environment information through the detector 110 during sound-based vibration control. The controller 150 may identify the weight and/or the sitting posture (a sitting state) of the user seated in the seat in the vehicle based on the seat environment information in the vehicle environment information. The controller 150 may determine the weight and the sitting posture of the user by analyzing the frequency-acceleration value and the surface pressure for each seat portion of the plurality of seat portions detected by the detector 110. The controller 150 may determine whether a body part (e.g., a back) of the user may be in a close contact based on a frequency-acceleration value at the seat back. The controller 150 may identify a maximum body pressure (a weight distribution) on the vehicle seat by analyzing a surface pressure distribution of the seat back and a lower frame and/or a surface pressure distribution of the seat cushion. The controller 150 may be configured to determine (estimate) the sitting posture (a surface pressure distribution area) by analyzing whether the body part is in the close contact based on the frequency-acceleration at the seat back and a load balance (in a left and right direction Y and a front and rear direction X) based on a frequency-acceleration at the seat cushion. The controller 150 may be configured to determine a location, an intensity, a frequency, a pattern, and/or a vibration excitation force of the sound-based vibration based on the weight distribution (the maximum body pressure) and the sitting posture of the user. The controller 150 may be configured to determine an appropriate frequency and a vibration pattern of the vibration signal based on the weight distribution and the sitting posture of the user. In addition, the controller 150 may be configured to correct the vibration pattern and/or the vibration excitation force based on the sitting posture of the user, the reproduced music, the travel environment, and/or a surrounding situation. The controller 150 may be configured to generate the seat vibration by controlling the vibration generator 140 based on the determined or corrected appropriate vibration frequency, vibration pattern, and/or vibration excitation force.

Hereinafter, the process of determining the appropriate frequency, the vibration pattern, and the vibration excitation force of the vibration signal will be described in more detail.

The controller 150 may be configured to determine the appropriate frequency (the appropriate vibration frequency) of the vibration signal based on the weight of the user. In other words, the controller 150 may determine the appropriate frequency for excitation of the seat vibration. When determining the appropriate frequency of the vibration signal, excitation (an excitation frequency) for each body part (e.g., the back and a thigh), that is, excitation for each seat portion may be different based on the weight and the sitting posture of the user. In addition, the controller 150 may determine the appropriate frequency for the excitation of the seat vibration for each seat portion to avoid resonance with a human body frequency equal to or lower than 60 Hz. The appropriate frequency may be determined (set) within a frequency range from 65 Hz to 90 Hz, which may be less sensitive to human body vibration. A structure has a natural frequency and vibrates when resonance occurs with an external excitation frequency. For example, when a seat resonance frequency is equal to or lower than 60 Hz, there may be a natural vibration mode of the seat, so that it may be necessary to avoid the resonance. The natural vibration mode of the seat may be divided into a torsional vibration mode by a reverse phase, a vertical bending vibration mode by a vertical bending, and a lateral bending vibration mode by a left and right vibration.

The controller 150 may be configured to determine the appropriate frequency $(f_b+f_f)^2$ of the vibration signal using a correlation equation (Mathematical Equation 1) derived through a big data analysis result of a human body modeling based on the seat sitting posture.

$$(f_b+f_f)^2 = k1+[k2/m] \qquad \text{[Mathematical Equation 1]}$$

Here, k1 may be a fixed variable set by a system designer in advance, k2 may be a seat stiffness, and "m", which may be the weight of the user, may be a relative variable. $f_b$ may be a seat back vibration excitation frequency, and $f_f$ may be a seat frame vibration excitation frequency. Distribution of $f_b$ and $f_f$ may be determined based on the sitting posture of the user.

In addition, the controller 150 may be configured to implement a vibration impact that may be generated when the vehicle may be shifted during travel by giving an impact signal to the vibration terminal mounted inside the seat.

The controller 150 may determine an optimal vibration pattern of the vibration generator 140 (that is, an individual actuator) by utilizing the seat environment information. Referring to FIG. 3, the vibration pattern may be implemented by a level and a peak time. The controller 150 may determine the optimal vibration pattern based on the seat environment, the travel environment, the reproduced music, and/or the image of the surrounding region.

The controller 150 may be configured to implement the optimal vibration pattern in consideration of the seat environment information such as the frequency-acceleration, the surface pressure, and the like for each seat portion. Referring to FIG. 4, because the maximum body pressure (the weight distribution) and the surface pressure distribution area (the sitting posture) vary based on the sitting posture of the user, the controller 150 may be configured to determine the vibration pattern based on the maximum body pressure and the surface pressure distribution area based on the sitting posture.

The controller 150 may be configured to give an optimal vibration excitation based on the travel environment such as the idle, the constant speed, the acceleration, or the like. The controller 150 may analyze the image of the surrounding region to determine whether there may be the dangerous situation, may greatly excite the vibration when it may be determined that there may be the dangerous situation, and may excite the vibration small when it may be determined that there may be no dangerous situation. In this connection, the controller 150 may adjust the vibration excitation force based on a beat of the reproduced music. As used herein, "great" and "small" are intended as relative terms to each other such that a higher excitation vibration may be felt during the dangerous situation while a lower excitation vibration may be felt during a non-dangerous situation. When a difference in the vibration excitation force in the left and right direction Y or in an up and down direction Z occurs, the controller 150 may control the load balance by adjusting the vibration excitation force. For example, the controller 150 may be configured to control the load balance by lowering a portion having a high vibration excitation force and raising a portion having a low vibration excitation force.

To solve a problem of feeling sound when generating the vibration by controlling the vibration terminal based on the sound signal that may not be a low-pitched tone, the controller 150 may perform customized vibration processing. The customized vibration processing, which may be a logic that generates a specific frequency as much as a magnitude of an input waveform, may generate a low-pitched tone vibration frequency even when a sound signal having a high-frequency waveform may be input. For example, when the custom vibration processing may be performed by filtering only a high-frequency voice region, the same vibration as a voice may occur. In addition, the customized vibration processing may also be possible for a low-pitched tone-filtered sound signal. When using the same, it may be possible to implement various vibrations even with the same signal using the same filter.

The controller 150 may be configured to perform vibration correction using a filter and a customized vibration-processed signal. For example, when a signal equal to or greater than a predetermined signal may be excessively input, the controller 150 may reduce the same by a predetermined ratio. In other words, the controller 150 may be configured to limit a range of fluctuation in consideration of sensitivity. As another example, when a signal equal to or greater than an input signal provided by hardware is input or when the vibration occurs to an extent that may be harmful to a human body, the controller 150 may limit an occurrence of vibration having an intensity equal to or greater than a limit value. As another example, the controller 150 may be configured to not generate the vibration signal when the vibration signal is insignificantly small, and generate the signal when the vibration signal having an intensity equal to or greater than a predetermined minimum intensity occurs. As another example, when a signal having a magnitude equal to or greater than a predetermined magnitude may be input, the controller 150 may be configured to magnify the same to generate an already inputted vibration amount.

The controller 150 may correct the vibration excitation force based on the sitting posture, the sound of the reproduced music, the travel environment (a travel pattern), and/or the surrounding situation. The controller 150 may distribute a vibration excitation force for each seat portion of the plurality of seat portions based on the sitting posture. The controller 150 may adjust the vibration excitation force weakly or strongly based on the music sound. The controller 150 may adjust a recognition intensity for each seat portion based on the travel environment. For example, the controller 150 may increase a recognition intensity of the back and the thigh based on the seat sitting posture in conditions of slow acceleration and rapid acceleration compared to the idle and the constant speed travel. The controller 150 may be configured to correct the vibration excitation force based on the surrounding situation. For example, the controller 150 may correct the vibration excitation force small when the surrounding situation may not be dangerous (a normal situation), and may correct the vibration excitation force great when it may be determined that there may be a risk of a pedestrian accident based on information of the image of the surrounding region. As used herein, "great" and "small" are intended as relative terms to each other such that a higher excitation vibration may be felt during the dangerous situation while a lower excitation vibration may be felt during a non-dangerous situation.

The controller 150 may differentiate the vibration excitation force for each seat portion of the plurality of seat portions by a difference in the seat surface pressure. In other words, the controller 150 may set the vibration excitation force for each seat portion differently based on the sitting posture. A weight distribution formula for each body part, for example, a weight distribution formula for the back and the thigh, may be derived through a seat surface pressure distribution and/or a vibration excitation force sensitivity evaluation. Referring to FIGS. 4A-4B and [Table 1], when the user is taking a right posture (a state with good sensitivity) like a sitting posture illustrated in FIG. 4A, the controller 150 may be configured to set the appropriate frequency to 70 Hz based on a sensitivity evaluation result for the good sensitivity sitting posture, and may set an average ratio of the recognition intensity of the back and the thigh to 5:5 at a standard amplitude (2G). When the user is taking a bent posture (a sensitivity dispersed state) like a sitting posture illustrated in FIG. 4B, the controller 150 may be configured to set the appropriate frequency to 90 Hz based on a sensitivity evaluation result for the dispersed sensitivity sitting posture, and set the average ratio of the recognition intensity of the back and the thigh to 7:3 at the standard amplitude (2G). The controller 150 may be configured to determine a vibration excitation force of the back and the thigh to 5:5 when the sitting state of the user is the good sensitivity sitting posture of FIG. 4A, and may determine the vibration excitation force of the back and the thigh to 7:3 when the sitting state of the user is the dispersed sensitivity sitting posture of FIG. 4B. That is, a ratio of the vibration excitation force of the back and the thigh may be determined by the average ratio of the recognition intensity of the back and the thigh.

TABLE 1

| Appropriate frequency | Amplitude | Back recognition intensity | Thigh recognition intensity | Ratio |
| --- | --- | --- | --- | --- |
| 70 Hz | 2 | 27.5 | 26.5 | 5:5 |
| 90 Hz | 2 | 32.5 | 15.0 | 7:3 |

The controller 150 may be configured to generate the vibration in consideration of the weight and the sitting state of the user (the sitting person) such that an emotional alertness and an emotional positivity move from negative to positive in a quadrant model for seat sensitivity determination.

Figure 5:
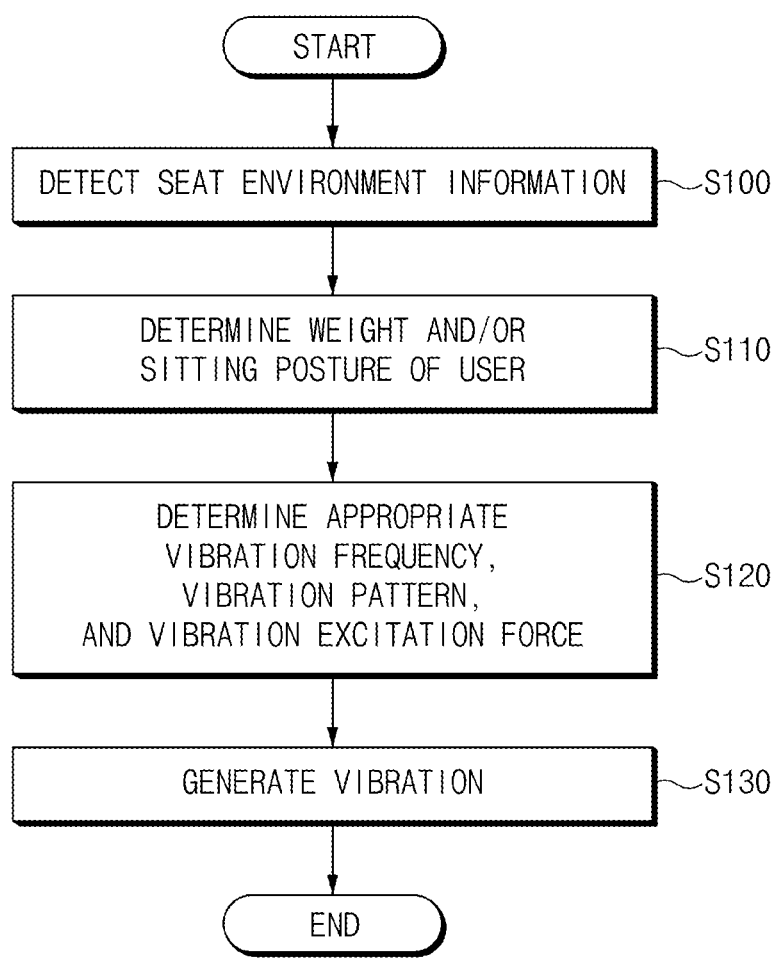
FIG. 5 is a flowchart illustrating a vehicle seat control method according to embodiments of the present disclosure.

FIG. 5 is a flowchart illustrating a vehicle seat control method according to embodiments of the present disclosure.

The controller 150 may detect the seat environment information through the detector 110 in S100. The detector 110 may use the accelerometer and/or the surface pressure sensor to measure data such as the frequency-acceleration and/or the surface pressure for each seat portion of the plurality of seat portions, and transmit the measured data as the seat environment information to the controller 150.

The controller 150 may determine the weight and/or the sitting posture of the user based on the seat environment information in S110. The controller 150 may determine whether each body part (e.g., the back and the thigh) of the user may be in close contact by analyzing the frequency-acceleration value at the seat back and a surface pressure distribution of the seat back and the lower frame. The controller 150 may be configured to determine the load balance (in the left and right direction and the front and rear direction) by analyzing the frequency-acceleration value and the surface pressure distribution of the seat cushion. The controller 150 may be configured to determine a sitting posture based on the maximum body pressure and the surface pressure distribution area on the vehicle seat based on the frequency-acceleration and/or the surface pressure for each seat portion.

The controller 150 may determine the appropriate vibration frequency, the vibration pattern, and the vibration excitation force based on the weight and the sitting posture of the user in S120. The controller 150 may determine the appropriate frequency of the vibration signal in the frequency range from 65 Hz to 90 Hz, which may be less sensitive to the human vibration, to avoid resonance with a natural vibration frequency of the human body (e.g., equal to or lower than 60 Hz for a chest and from 2 to 20 Hz for a knee). The controller 150 may determine the appropriate frequency using the weight of the user. The controller 150 may be configured to distribute the appropriate frequency determined based on the sitting posture of the user as a vibration frequency for each seat portion. The controller 150 may be configured to determine the vibration pattern by adjusting the level and the peak time of the vibration signal based on the load balance. The controller 150 may be configured to correct the vibration excitation force based on the seat environment, the sound of the reproduced music (e.g., a quiet classical music, a beat music, and the like), the travel environment (e.g., a constant speed travel condition, an accelerated travel condition, and the like), and/or the surrounding situation (e.g., the dangerous situation).

The controller 150 may be configured to generate the seat vibration by controlling the vibration generator 140 based on the determined appropriate vibration frequency, vibration pattern, and vibration excitation force in S130.

Figure 6:
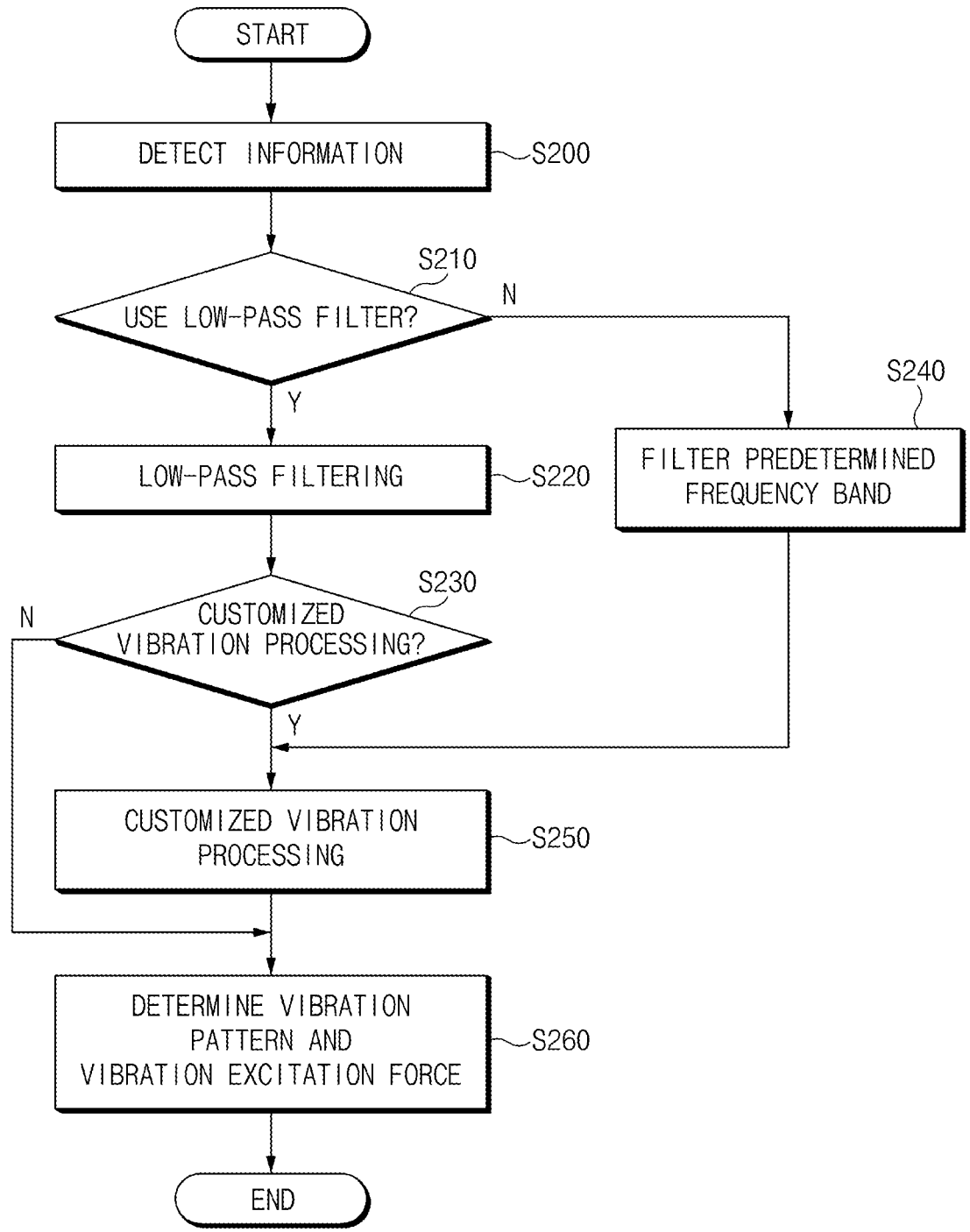
FIG. 6 is a flowchart illustrating a method for determining a vibration pattern and a vibration excitation force according to embodiments of the present disclosure.

FIG. 6 is a flowchart illustrating a method for determining a vibration pattern and a vibration excitation force according to embodiments of the present disclosure.

The controller 150 of the vehicle seat control device 100 may be configured to process the sound input to itself as the vibration. The controller 150 may receive (sense) the sound of the sound source (the music) reproduced by the sound generator 130.

The controller 150 may be configured to detect the vehicle external and internal environment information (the vehicle environment information) using the detector 110 in S200. The vehicle environment information may include at least one of the information such as the seat environment, the travel environment, the sound of the reproduced music, and/or the image of the surrounding region (the surrounding situation).

The controller 150 may be configured to determine whether to use a low-pass filter in S210. The controller 150 may determine which frequency band of the input sound to use for the vibration implementation.

When the use of the low-pass filter is determined, the controller 150 may be configured to filter a low-frequency band from the sound (S220). The controller 150 may be configured to extract a sound of a low-pitched tone portion from the reproduced music.

The controller 150 may be configured to determine whether to perform the customized vibration processing on the filtered sound in S230. The controller 150 may be configured to determine whether to perform the customized vibration processing on the sound of the low-pitched tone portion. A filtered sound may be generated after filtering. It is not intended that the system recreate or emit an actual audio sound with the filtered sound. Instead, the filtered sound may simply be the processed signal or data after the filtering step of the sound.

When non-use of the low-pass filter may be determined, the controller 150 may filter a predetermined frequency band (a high frequency band or a high-pitched tone portion) from the sound in S240. For example, the controller 150 may be configured to determine the non-use of the low-pass filter when it is desired to implement a voice in the music as the vibration. When the low-pass filter is not used, the controller 150 may be configured to extract a sound of the predetermined specific frequency band from the music. A filtered sound may be generated after extracting the sound of the specific frequency band from the music. It is not intended that the system recreate or emit an actual audio sound with the filtered sound. Instead, the filtered sound may simply be the processed signal or data after the filtering step of the sound.

When it may be determined in S230 to perform the customized vibration processing for the low-pass filtered sound or when the sound of the predetermined frequency band may be filtered in S240, the controller 150 may be configured to perform the customized vibration processing (conversion) in S250. The customized vibration processing, which may be the logic that generates the specific frequency as much as the magnitude of the input waveform, may generate the low-pitched tone vibration frequency even when there is the high-frequency waveform. For example, when the custom vibration processing is performed by filtering only the high-frequency voice region, the same vibration as the voice may occur.

The controller 150 may be configured to determine the vibration pattern and the vibration excitation force by performing the vibration correction using the low-pass filtered and/or customized vibration-processed signal in S260. The controller 150 may implement the seat vibration based on the information such as the seat environment, the travel environment, the sound of the reproduced music, and/or the image of the surrounding region. To this end, the controller 150 may be configured to determine the appropriate frequency of the vibration signal based on the weight of the user. The controller 150 may be configured to determine the optimal vibration pattern (e.g., the level and the peak time) based on whether the back of the user is in the close contact, the surface pressure distribution area, and/or the load balance. The controller 150 may implement the sound-based vibration by referring to the sound of the reproduced music and the image of the surrounding region information (a warning of a risk factor other than the pedestrian). The controller 150 may be configured to correct vibration excitation forces in the front and rear direction (the X direction) of the seat back and the up and down direction (the Z direction) of the seat cushion based on the travel environment, the surrounding situation, and/or the sound of the reproduced music.

Thereafter, the controller 150 may be configured to control the vibration generator 140 based on the determined vibration pattern and vibration excitation force. The vibration generator 140 may generate the seat vibration based on the vibration pattern and the vibration excitation force determined under the control of the controller 150.

Figure 7:
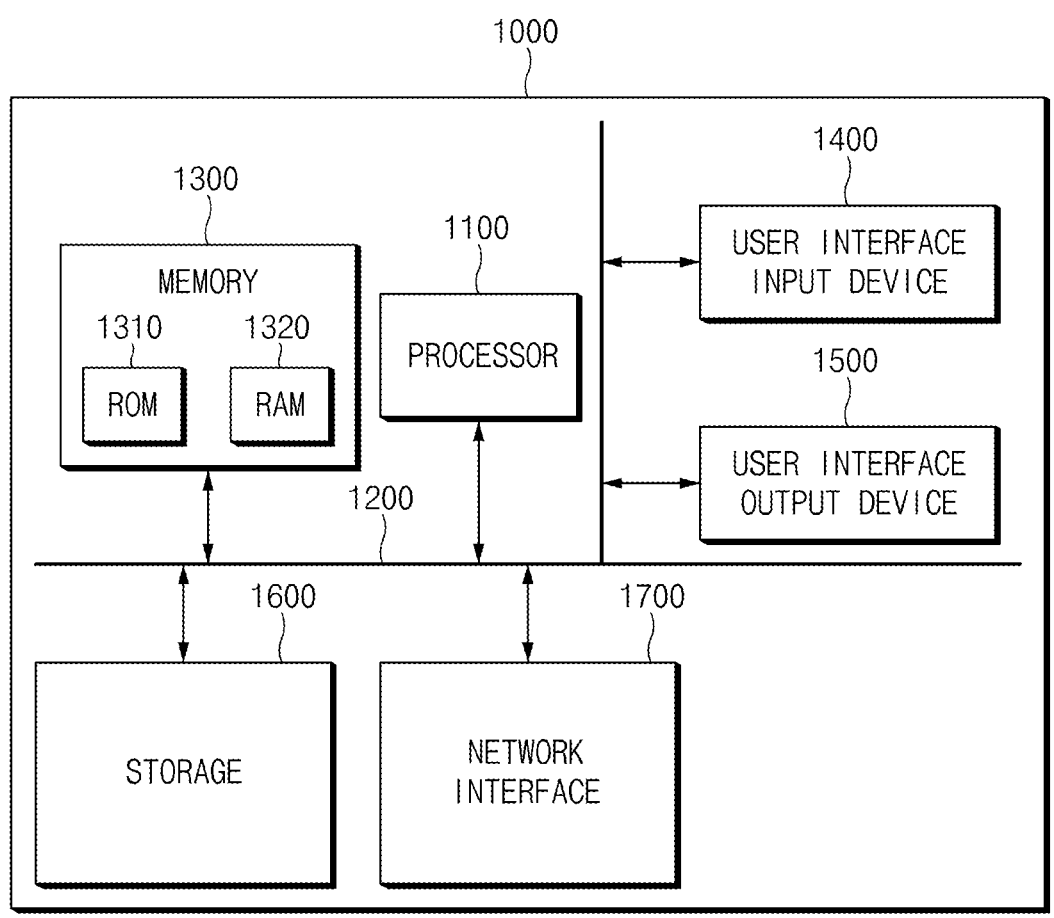
FIG. 7 is a block diagram illustrating a computing system executing a vehicle seat control method according to embodiments of the present disclosure.

FIG. 7 is a block diagram illustrating a computing system executing a vehicle seat control method according to embodiments of the present disclosure.

Referring to FIG. 7, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EFPROM, a register, a hard disk, a removable disk, and a CD-ROM. The exemplary storage medium may be coupled to the processor 1100, which may read information from, and write information to, the storage medium. In an exemplary embodiment of the method, the storage medium may be integral with the processor 1100. The processor 1100 and the storage medium may reside within an application specific integrated circuit (ASIC). The ASIC may reside within the user terminal. In another method, the processor 1100 and the storage medium may reside as individual components in the user terminal.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the present disclosure, when the seat vibration occurs based on the sound, the frequency, the pattern, and/or the excitation force of the seat vibration may be optimized based on the weight and the sitting posture of the vehicle occupant, so that the sound-based vibration optimized for each occupant may be implemented.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling a vehicle seat for controlling seat vibration, the device comprising:
a detector for detecting vehicle environment information;
a vibration generator mounted on the vehicle seat to generate the seat vibration; and
a controller electrically connected to the detector and the vibration generator,
wherein the controller is configured to:
detect seat environment information through the detector;
determine a weight and a sitting posture of a user seated in the vehicle seat based on the seat environment information;
determine a vibration pattern and a vibration excitation force based on the weight and the sitting posture of the user; and
generate the seat vibration by controlling the vibration generator based on the vibration pattern and the vibration excitation force;
wherein the detector detects a frequency-acceleration and a surface pressure for a plurality of seat portions using an accelerometer and a surface pressure sensor.

2. The device of claim 1, wherein the controller is configured to analyze the frequency-acceleration and a surface pressure distribution for each of the plurality of seat portions to estimate a maximum body pressure on the vehicle seat and the sitting posture.

3. The device of claim 1, wherein the controller is configured to:
determine an appropriate vibration frequency based on the weight of the user; and
distribute the appropriate vibration frequency as an appropriate vibration frequency for each seat portion based on the sitting posture.

4. The device of claim 1, wherein the controller is configured to determine a level and a peak time of the seat vibration based on the weight and the sitting posture of the user.

5. The device of claim 1, further comprising a sound generator generating a sound, wherein the controller is configured to:
determine whether to use a low-pass filter based on the sound;
filter a low-frequency band of the sound when it is determined to use the low-pass filter to generate a filtered sound; and
determine the vibration pattern and the vibration excitation force of the seat vibration based on the filtered sound.

6. The device of claim 5, wherein the controller may be configured to:
filter a portion of the sound in a predetermined frequency band from the sound when it may be determined to not use the low-pass filter to generate the filtered sound;
process the filtered sound as a vibration signal having a vibration frequency based on a magnitude of a waveform of the filtered sound; and
determine the vibration pattern and the vibration excitation force of the seat vibration based on the processed vibration signal.

7. The device of claim 5, wherein the controller is configured to correct the vibration excitation force based on at least one of the sitting posture, the sound, a travel environment, or a surrounding situation.

8. A method for controlling a vehicle seat for controlling seat vibration, the method comprising:
detecting, by a controller, seat environment information through a detector;

determining, by the controller, a weight and a sitting posture of a user seated in the vehicle seat based on the seat environment information;

determining, by the controller, a vibration pattern and a vibration excitation force based on the weight and the sitting posture of the user; and generating, by the controller, the seat vibration by controlling a vibration generator based on the determined vibration pattern and vibration excitation force;

wherein the detecting of the seat environment information includes detecting, by the detector, a frequency-acceleration and a surface pressure for a plurality of seat portions using an accelerometer and a surface pressure sensor.

9. The method of claim 8, wherein the determining of the weight and the sitting posture of the user includes:

analyzing, by the controller, the frequency-acceleration and a surface pressure distribution for each of the plurality of seat portions to estimate a maximum body pressure on the vehicle seat and the sitting posture.

10. The method of claim 8, further comprising:

determining, by the controller, an appropriate vibration frequency based on the weight of the user; and distributing, by the controller, the appropriate vibration frequency as an appropriate vibration frequency for each of a plurality of seat portions based on the sitting posture.

11. The method of claim 8, wherein the determining of the vibration pattern and the vibration excitation force includes:

determining, by the controller, a level and a peak time of the seat vibration based on the weight and the sitting posture of the user.

12. The method of claim 11, further comprising generating a sound with a sound generator, wherein the determining of the vibration pattern and the vibration excitation force further includes:

determining, by the controller, whether to use a low-pass filter based on the sound;

filtering, by the controller, a low-frequency band of the sound when it is determined to use the low-pass filter to generate a filtered sound; and determining, by the controller, the vibration pattern and the vibration excitation force of the seat vibration based on the filtered sound.

13. The method of claim 12, wherein the determining of the vibration pattern and the vibration excitation force includes:

filtering, by the controller, a sound of a predetermined frequency band from the sound when it may be determined to not use the low-pass filter to generate the filtered sound;

processing, by the controller, the filtered sound as a vibration signal having a vibration frequency based on a magnitude of a waveform of the filtered sound; and determining, by the controller, the vibration pattern and the vibration excitation force of the seat vibration based on the processed vibration signal.

14. The method of claim 12, further comprising:

correcting the vibration excitation force based on at least one of the sitting posture, the sound, a travel environment, or a surrounding situation.

* * * * *